Feb. 7, 1933.   H. BENNETT   1,896,998
SHIP'S TRIM INDICATOR
Filed Oct. 30, 1929   2 Sheets-Sheet 1

Harry Bennett
INVENTOR
BY Victor J. Evans
ATTORNEY

Feb. 7, 1933.  H. BENNETT  1,896,998
SHIP'S TRIM INDICATOR
Filed Oct. 30, 1929  2 Sheets-Sheet 2
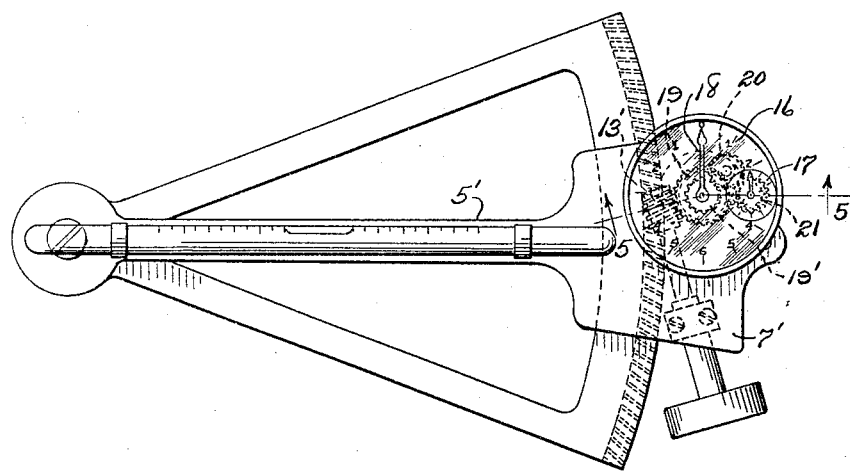
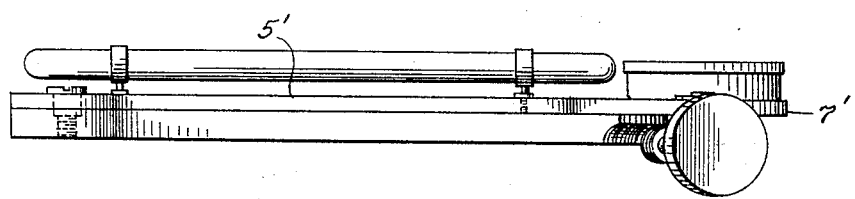
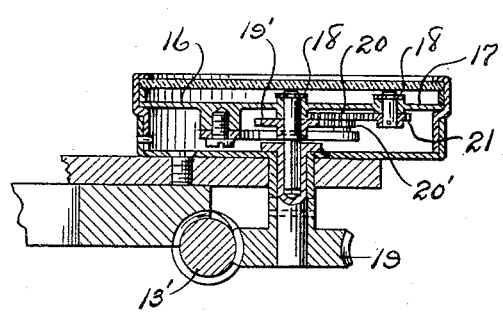
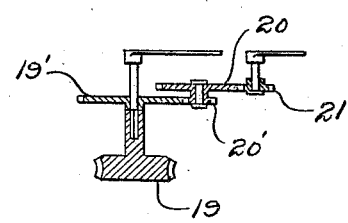
Harry Bennett
INVENTOR
BY Victor J. Evans
ATTORNEY Patented Feb. 7, 1933

1,896,998

UNITED STATES PATENT OFFICE

HARRY BENNETT, OF GALVESTON, TEXAS

SHIP'S TRIM INDICATOR

Application filed October 30, 1929, Serial No. 403,578, and in Germany May 25, 1929.

This invention relates to a ship's trim indicator, the general object of the invention being to provide a frame having a vertically arranged arc at one end thereof, a bubble glass carrying arm pivoted to the frame and having a window therein for exposing portion of a scale on the arm, with a tangent endless screw or worm engaging teeth on the arc and having a micrometer head on the end of the screw shaft, whereby by turning the screw, the arm can be adjusted to center the bubble in the glass and the reading obtained from the micrometer head to ascertain the angle of the ship's keel.

A modification of the invention includes interchangeable gearing for securing the reading by means of hands and scales associated with the device, whereby by changing the gearing, the device can be used on ships of different lengths.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 3 is a front view of the second form of the invention.

Figure 4 is an edge view thereof.

Figure 5 is a section on line 5—5 of Figure 3.

Figure 6 is a sectional detail view showing how the gears for operating the fingers are arranged.

Figure 1:
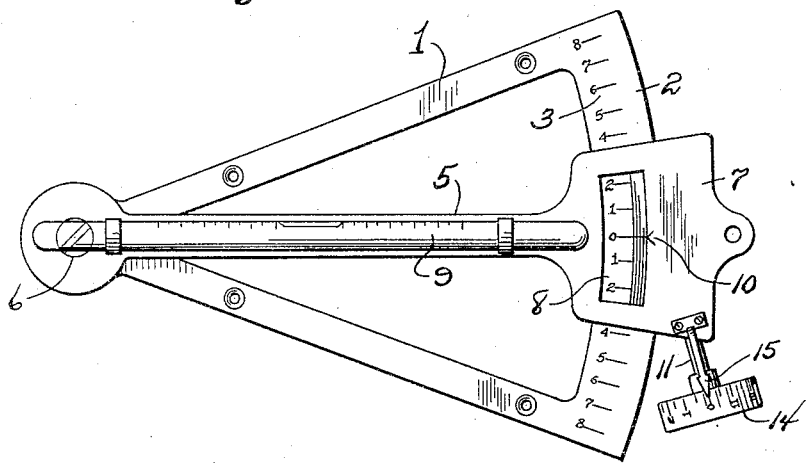
Figure 1 is a front view of the first form of the invention.
Figure 2:
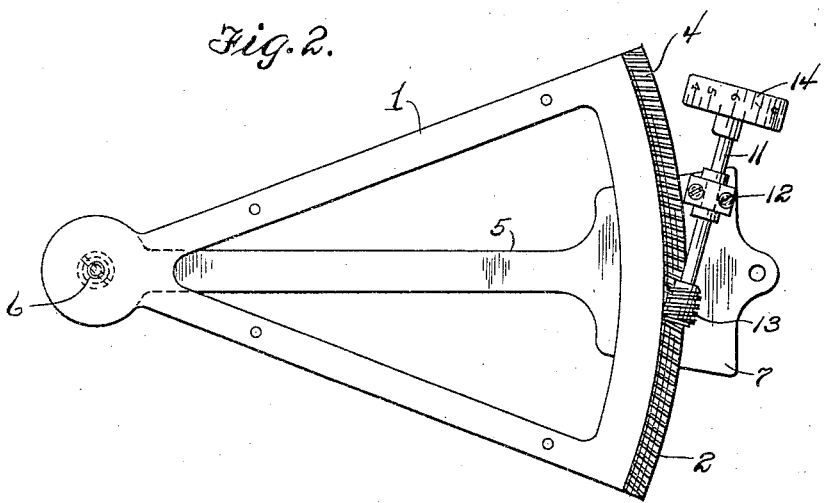
Figure 2 is a rear view thereof.

Referring to Figures 1 and 2, the numeral 1 indicates a substantially triangular shaped frame, the wide end of which is of arc shape, as shown at 2, and is provided with the scale 3 on its front face and with the rack 4 on its rear face. An arm 5 is pivoted at one end to the small end of the frame, as shown at 6, the other end of the arm being enlarged, as shown at 7, and having a window 8 therein for exposing a portion of the scale 3. A bubble glass 9 is attached to the arm and if the ship is on an even keel, when the bubble glass is in its central position, the marker 10 on the enlargement 7 will be at the zero point on the scale, as shown in Figure 1. A shaft 11 is journaled on the rear face of the enlargement, as shown at 12, and has an endless screw or worm 13 on one end thereof which meshes with the teeth of the rack 4. A micrometer head 14 is attached to the opposite end of the shaft and a finger or arrow 15 is attached to the enlargement 7 and cooperates with the scale of the head.

The frame 1 is adapted to be placed in any suitable part of a ship, such as a fore-and-aft wall of the chart house and as before stated, the parts should be so arranged that the pointer 10 will be at zero when the bubble in the glass is in its neutral position. When it is desired to ascertain the "drag" of the ship, it is simply necessary to turn the shaft by its head 14 so as to bring the arm 5 to its zero position, and the amount of movement of the head, indicated by the scale thereon, will indicate the angle of the keel of the ship.

The graduations of the scale 3 may be made to indicate feet or meters and the graduations on the head inches or centimeters, one revolution of the head moving the arm from one graduation of the scale 3 to another.

In the modification shown in Figures 3, 4, 5 and 6, I place a large dial 16 on the enlargement 7' of the arm 5' and this dial carries a small dial 17. A finger 18 cooperates with each dial and the arbor of the finger for the large dial has a gear 19 attached thereto which is engaged by the worm 13' and a gear 19' on the arbor meshes with a pinion 20' associated with a gear 20 which meshes with a gear 21 on the arbor of the small finger. Thus the fingers are moved over the dials by the turning of the worm shaft to give the readings.

It is of course to be understood that the connections between the shaft 11 carrying the worm 13′ and to the pointer or finger 18 may be varied if found desirable.

This form of the device can be used on ships of different lengths by changing the gears to compensate for the difference in length.

This instrument will enable the proper reductions to be applied to the sounding of fuel oil tanks in determining the amount of fuel oil on hand and can be used whenever it is desired to ascertain the "drag" of a ship, such as when the ship is entering a harbor, passing over bars or where it is desired to get the exact trim to get the best speed out of the ship.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a frame having an arc shaped part provided with a scale, an arm pivoted to the frame at one end and having an enlargement at its free end arranged over the arc shaped part, a bubble glass carried by the arm, said arc shaped part having a rack thereon, a shaft journaled in the enlarged part of the arm and having a gear thereon engaging the rack, dials on the enlarged part of the arm, arbors rotatably arranged in the enlargement and having fingers thereon cooperating with the dials and gearing for driving the arbors from the shaft.

HARRY BENNETT.